(12) United States Patent
Chen

(10) Patent No.: US 6,729,204 B1
(45) Date of Patent: May 4, 2004

(54) BICYCLE PEDAL ASSEMBLY WITH A CLEAT ADAPTED TO BE CONNECTED FIXEDLY TO A SHOE

(76) Inventor: Chung-I Chen, No. 3, Kung-Chi Rd., Yu-Ssi-Kung-Yeh Dist., Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 10/414,381

(22) Filed: Apr. 15, 2003

(51) Int. Cl.⁷ .............................. B62M 3/08; G05G 1/14
(52) U.S. Cl. .................................... 74/534.6; 74/594.4
(58) Field of Search ............................ 74/594.4, 594.6; 36/131, 132; D12/125

(56) References Cited

U.S. PATENT DOCUMENTS

| | | | | |
|---|---|---|---|---|
| 5,203,229 A | * | 4/1993 | Chen | 74/594.6 |
| 6,012,356 A | * | 1/2000 | Ueda | 74/594.6 |
| 6,105,462 A | * | 8/2000 | Ueda | 74/594.6 |
| 6,230,583 B1 | * | 5/2001 | Ohno | 74/594.6 |
| 6,282,984 B1 | * | 9/2001 | Chen | 74/594.6 |
| 6,324,941 B1 | * | 12/2001 | Ho | 74/594.6 |
| 6,393,940 B1 | * | 5/2002 | Ueda | 74/594.6 |
| 6,490,948 B2 | * | 12/2002 | Tanaka | 74/594 |
| 6,520,048 B2 | | 2/2003 | Chen | |
| 2002/0104403 A1 | * | 8/2002 | Chen | 74/594.6 |
| 2002/0170382 A1 | * | 11/2002 | Yang | 74/594.6 |
| 2003/0029271 A1 | * | 2/2003 | Shuman | 74/594.6 |

FOREIGN PATENT DOCUMENTS

| | | | | |
|---|---|---|---|---|
| EP | 000428140 A1 | * | 5/1991 | 74/594.6 |
| EP | 000485956 A1 | * | 5/1992 | 74/594.6 |

* cited by examiner

*Primary Examiner*—Vinh T. Luong
(74) *Attorney, Agent, or Firm*—Ladas & Parry

(57) ABSTRACT

A bicycle pedal assembly includes a unitary pedal body that is sleeved rotatably on a pedal shaft and that has two front retaining portions. Two rear retaining units are connected to the pedal body. A unitary cleat is adapted to be connected fixedly to a shoe of the rider, and has a front end engaging portion inserted into one of the front retaining portions, and a rear end engaging portion confined between the pedal body and a corresponding one of the rear retaining units.

5 Claims, 7 Drawing Sheets

BICYCLE PEDAL ASSEMBLY WITH A CLEAT ADAPTED TO BE CONNECTED FIXEDLY TO A SHOE

BACKGROUND OF THE INVENTION

1. Field of the Invention

This invention relates to a bicycle pedal assembly, and more particularly to a bicycle pedal assembly that includes a cleat, which is adapted to be connected to a shoe of the rider.

2. Description of the Related Art

Referring to FIGS. 1, 2, and 3, a conventional bicycle pedal assembly is shown to include a pedal shaft 10, a pedal body 11, two front retaining units 12, two rear retaining units 13, and a cleat 14 (see FIG. 3). The pedal shaft 10 is connected to a crank (not shown). The pedal body 11 has an annular frame 111 and a shaft tube 112 that is formed integrally with the frame 111, that is sleeved rotatably on the pedal shaft 10, and that defines two chambers 113 in the frame 111 on two sides of the shaft tube 112. The front retaining units 12 are disposed on two opposite sides of the shaft tube 112. Each of the front retaining units 12 includes a positioning plate 121, two bolts 122, a front retaining hook 123, and a front retaining groove 124. The positioning plates 121 are connected fixedly to the shaft tube 112 by means of the bolts 122. The rear retaining units 13 are disposed respectively within the chambers 113. Each of the rear retaining units 13 includes two retaining elements (13A). Each of the retaining elements (13A) has a rear plate 130, two parallel side plates 131 extending integrally and perpendicularly from two opposite sides of the rear plate 130 toward the shaft tube 112 in a direction perpendicular to the shaft tube 112, and a rear retaining plate 132 extending from a top end of the rear plate 130 toward the shaft tube 112. The rear retaining plates 132 of each adjacent pair of the retaining elements (13A) define a rear retaining groove 133 therebetween. Each of the rear retaining units 13 further includes a pivot pin 134, an adjustment bolt 135, an adjustment plate 136, and two coiled torsional springs 137. The pivot pins 134 extend through the side plates 131 of the retaining elements (13A) so as to connect the retaining elements (13A) rotatably to the frame 111. The adjustment bolts 135 are disposed rotatably on the frame 11, are aligned with each other, and are disposed between the retaining elements (13A) of each of the rear retaining units 13. The adjustment plates 136 are disposed respectively within the chambers 113, and engage respectively and threadably the adjustment bolts 135. The torsional springs 137 are disposed respectively within the retaining elements (13A), and are disposed respectively on the pivot pins 134. Each of the springs 137 has a first end 138 pressing against a respective one of the rear plates 130 of the retaining elements (13A), and a second end 139 pressing against the adjustment plates 136 and disposed between the corresponding adjustment plate 136 and the frame 111. The front and rear retaining units 12, 13 define two cleat-receiving spaces 140 (see FIG. 3). The cleat 14 is adapted to be connected fixedly to a shoe (not shown) of the rider. Although the cleat 14 can be fixed firmly within one of the cleat-receiving spaces 140 by the corresponding front and rear retaining units 12, 13, the aforesaid conventional pedal assembly includes numerous elements, thereby resulting in a comparatively complex pedal structure.

SUMMARY OF THE INVENTION

The object of this invention is to provide a bicycle pedal assembly that has a relatively simple structure. According to this invention, a bicycle pedal assembly includes a unitary pedal body that is sleeved rotatably on a pedal shaft and that has two front retaining portions. Two rear retaining units are connected to the pedal body. A unitary cleat is adapted to be connected fixedly to a shoe of the rider, and has a front end engaging portion inserted into one of the front retaining portions, and a rear end engaging portion confined between the pedal body and a corresponding one of the rear retaining units. Because the front retaining portions are formed integrally on the pedal body, there is no need to provide a plurality of bolts for connecting the front retaining portions to the pedal body. As such, the structure of the bicycle pedal assembly of this invention is relatively simple, thereby resulting in lower manufacturing costs.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
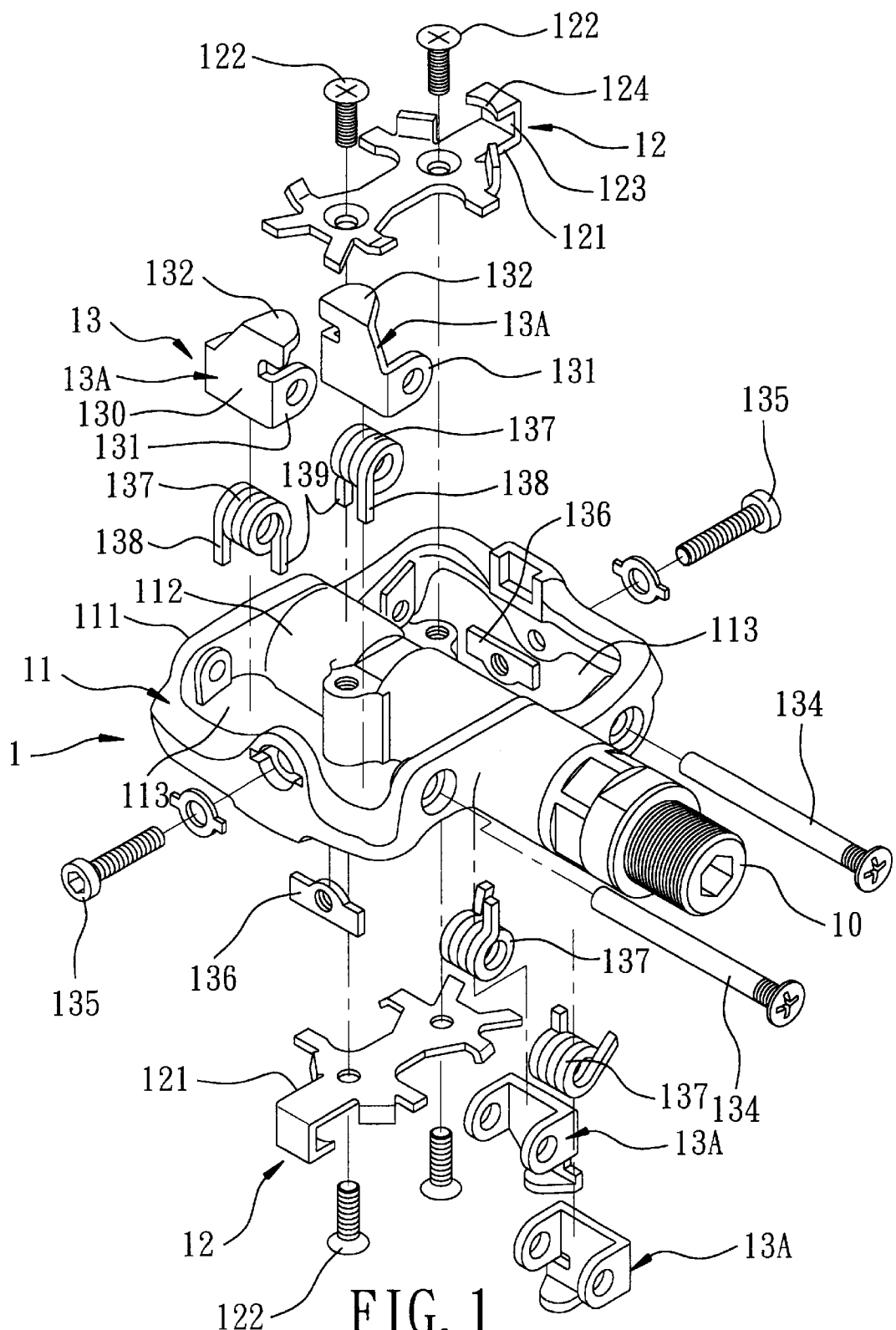
FIG. 1 is a partly exploded view of a conventional pedal assembly.
Figure 2:
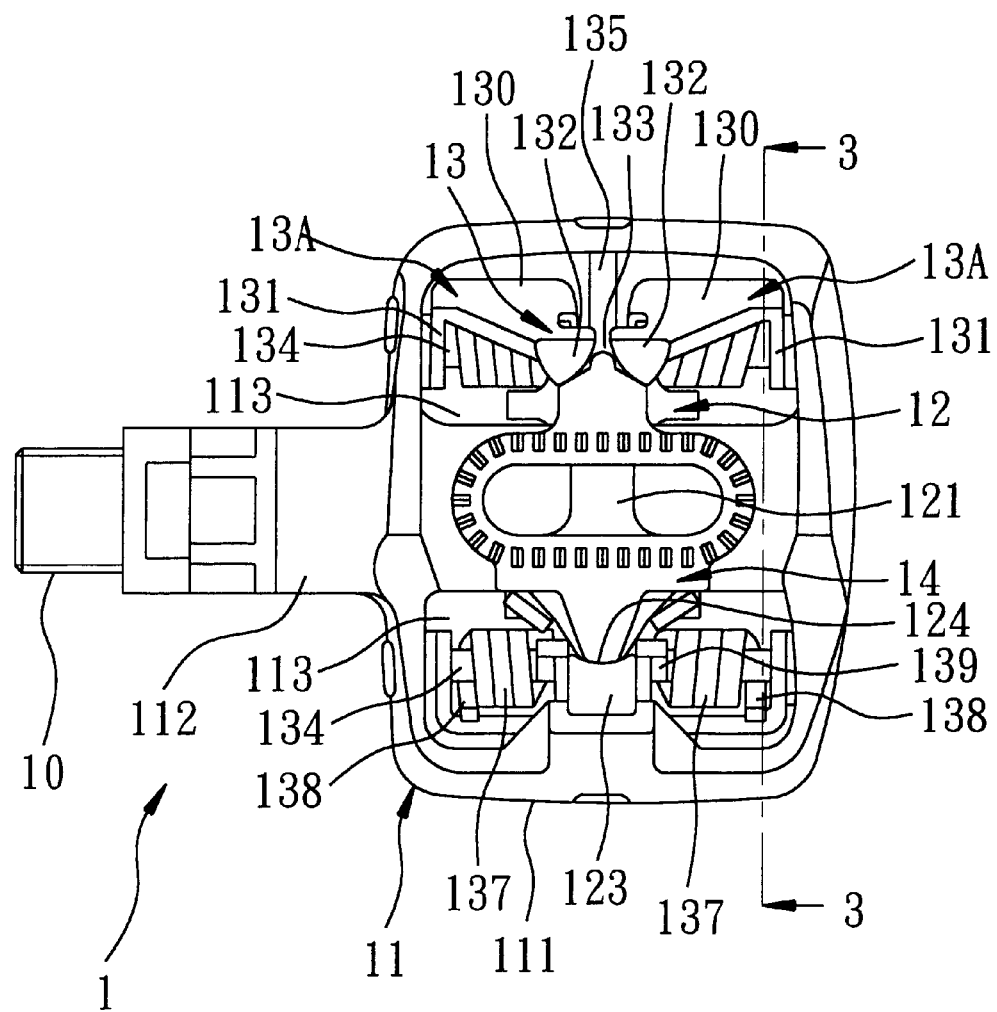
FIG. 2 is a top view of the conventional pedal assembly.
Figure 3:
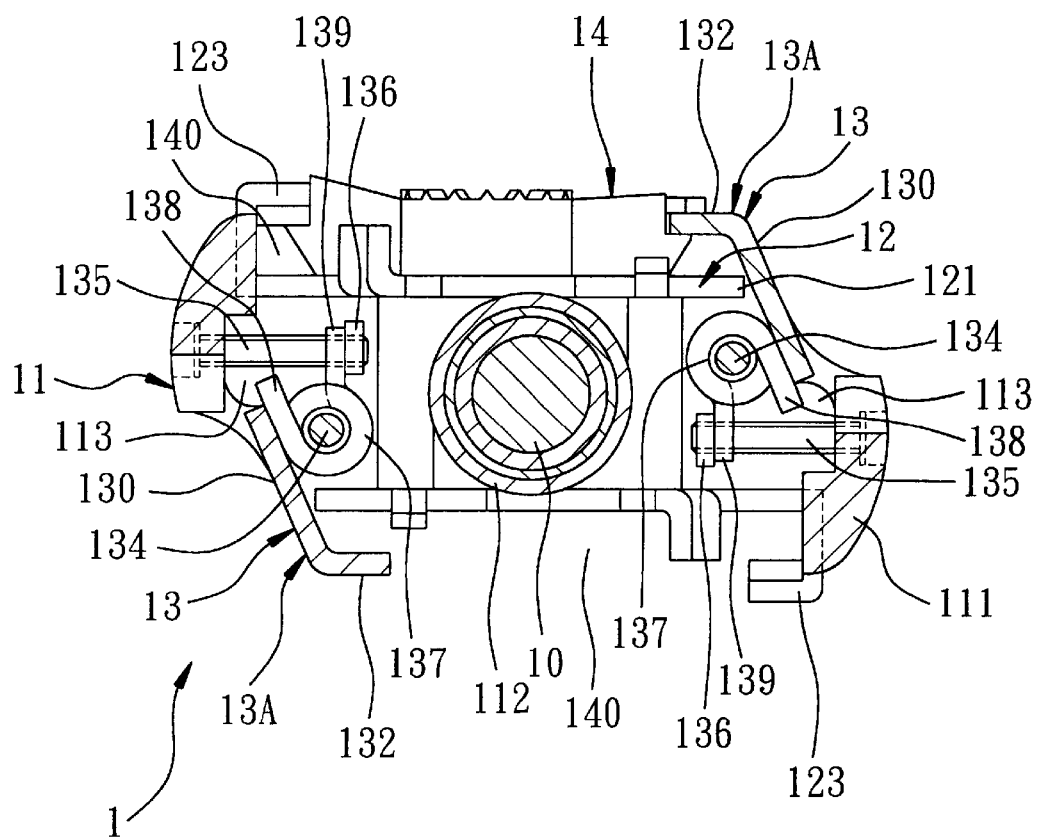
FIG. 3 is a sectional view taken along line 3—3 in FIG. 2.
Figure 4:
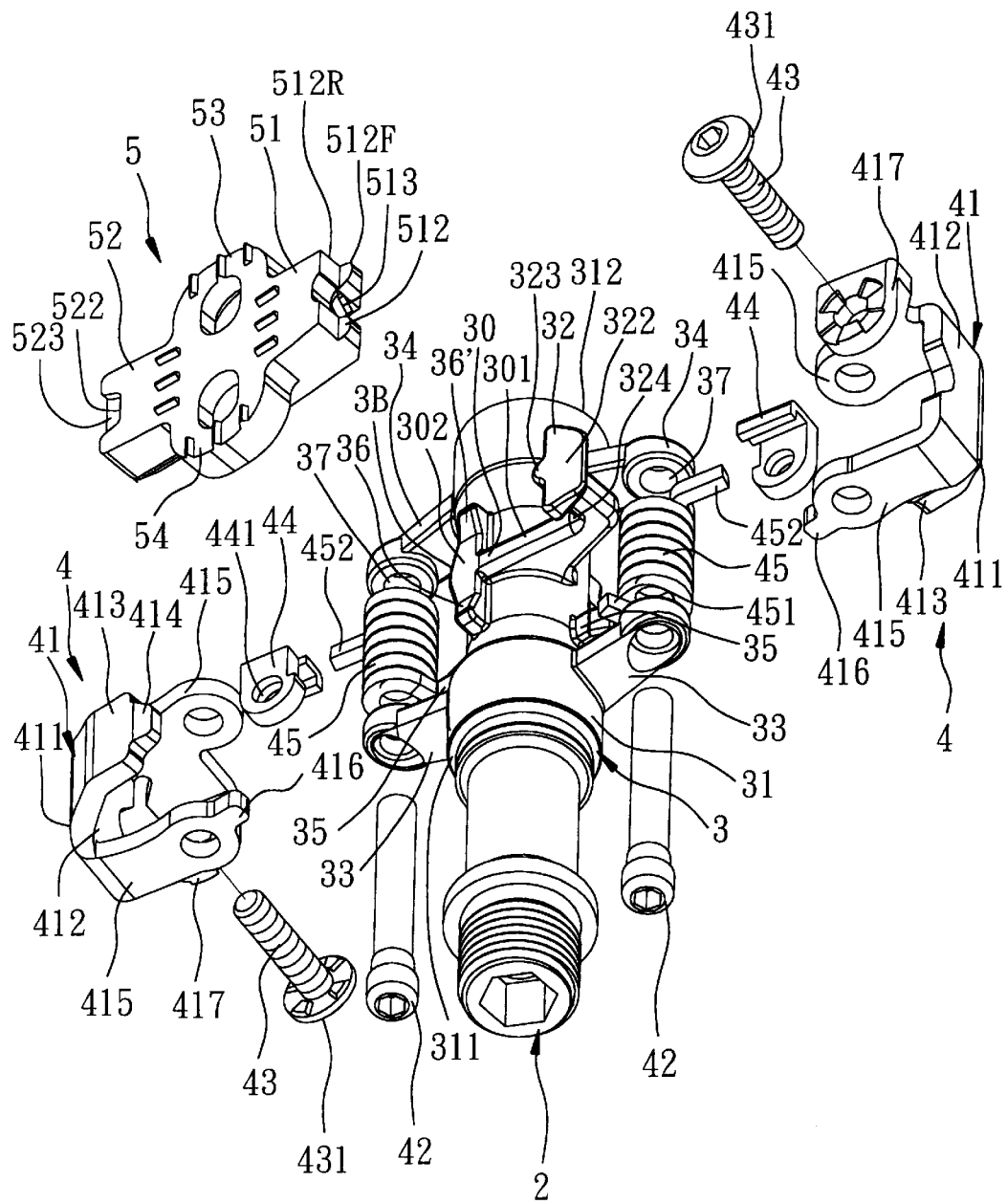
FIG. 4 is a partly exploded perspective view of the preferred embodiment of a bicycle pedal assembly according to this invention.
Figure 5:
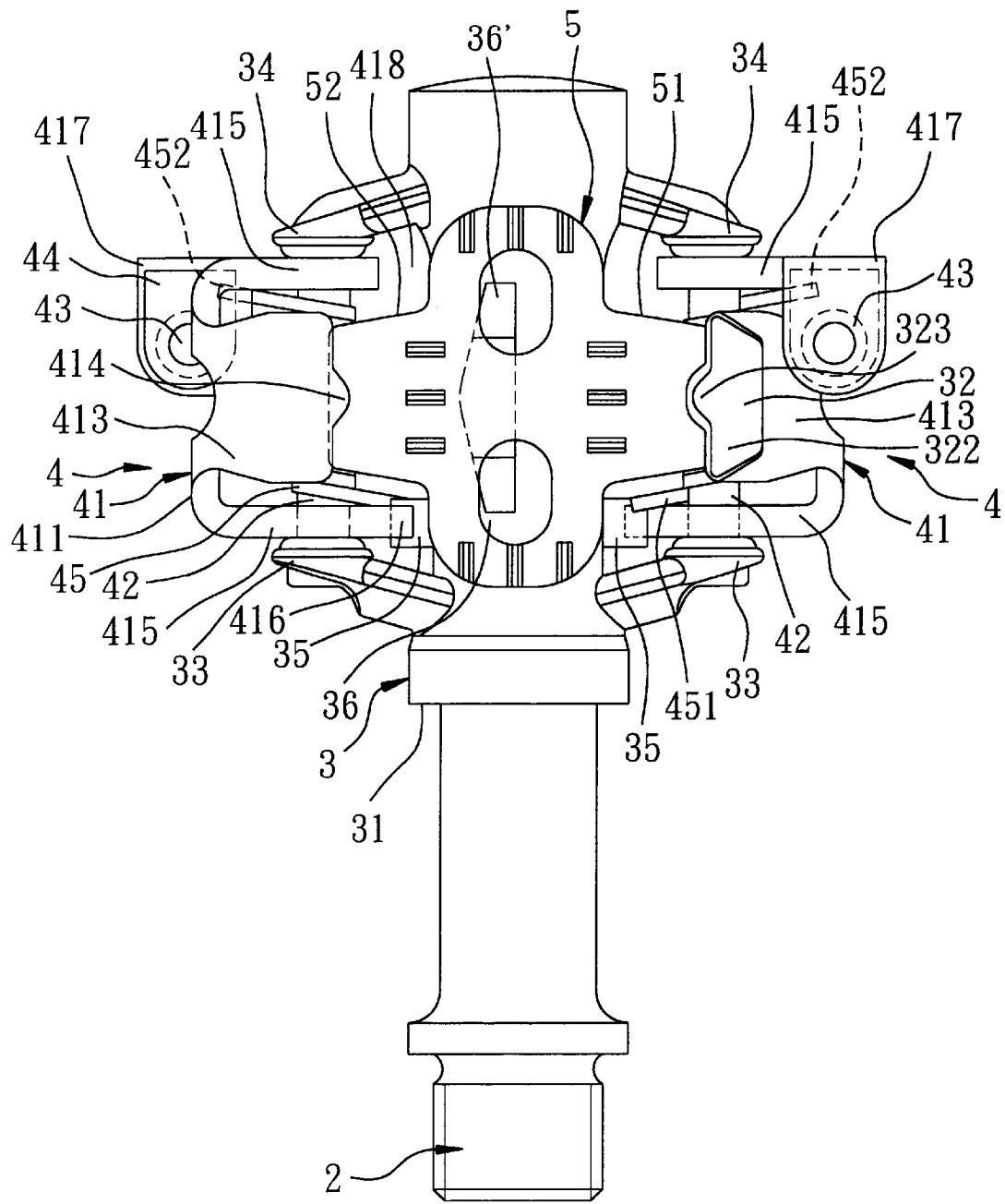
FIG. 5 is a top view of the preferred embodiment.
Figure 6:
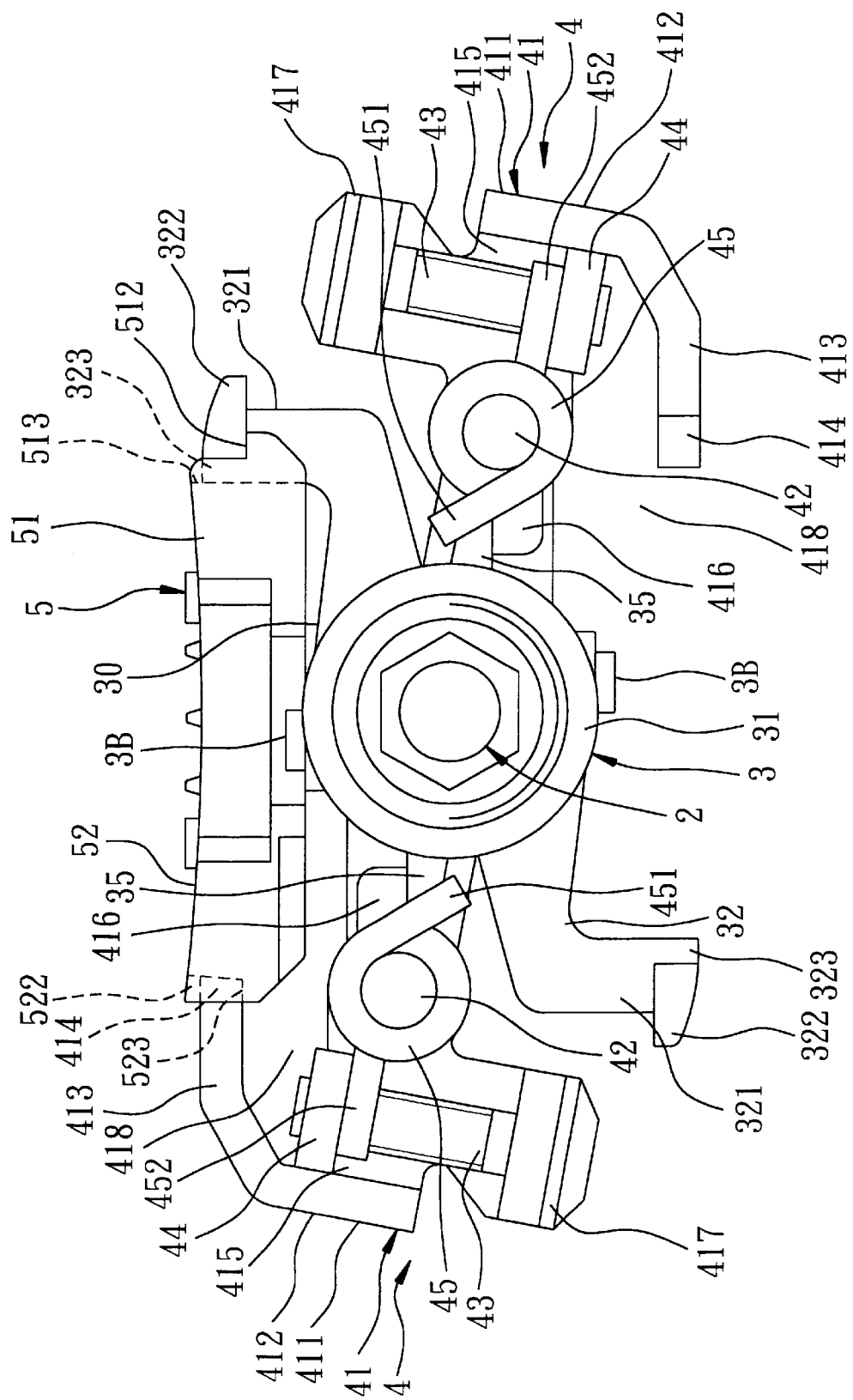
FIG. 6 is a schematic side view of the preferred embodiment, illustrating how a cleat is confined between a front retaining portion of a pedal body and a retaining element of a rear retaining unit of the preferred embodiment.

Referring to FIGS. 4, 5, and 6, the preferred embodiment of a bicycle pedal assembly according to this invention is shown to include a pedal shaft 2, a unitary pedal body 3, two rear retaining units 4, and a unitary cleat 5 that is retained on the pedal body 3 by means of a selected one of the rear retaining units 4.

The pedal shaft 2 is connected to a driving crank (not shown) in a known manner. The pedal body 3 includes two opposite cleat-supporting surfaces 30 (only one is shown in FIG. 4), a shaft tube 31, two front retaining portions 32 (only one is shown in FIG. 4), two aligned inner pivot arms 33, two aligned outer pivot arms 34, two front abutment portions 35, and two guiding units (only one is shown in FIG. 4), each of which consists of a pair of inclined inner and outer cleat-guiding surfaces 36, 36'. The pedal body 3 further includes two T-shaped integral projections (3B) (see FIG. 4), each of which is formed with a respective one of the cleat-supporting surfaces 30, a respective one of the inner cleat-guiding surfaces 36, and a respective one of the outer cleat-guiding surfaces 36'.

The shaft tube 31 is sleeved rotatably on the pedal shaft 2 in a known manner, and has an inner end 311 and an outer end 312.

Each of the cleat-supporting surfaces 30 is planar and T-shaped, and includes an elongated front surface portion 301 extending along a transverse direction of the shaft tube 31, and an elongated rear surface portion 302 extending along a longitudinal direction of the shaft tube 31 and having a middle portion, from which the front surface portion 301 extends forwardly. In each of the guiding units, the inner cleat-guiding surface 36 extends inwardly from an inner end of the rear surface portion 302 of the corresponding cleat-supporting surface 30, and is inclined relative to the rear surface portion 302 of the corresponding cleat-supporting surface 30 in a direction away from the shaft tube 31, and the outer cleat-guiding surface 36' extends outwardly from an outer end of the rear surface portion 302 of the corresponding cleat-supporting surface 30, and is inclined relative to the rear surface portion 302 of the corresponding cleat-supporting surface 30 in a direction away from the shaft tube 31.

The front retaining portions 32 are formed on two opposite sides of the shaft tube 31, and extend respectively, integrally, and perpendicularly from front ends of the projections (3B). Each of the front retaining portions 32 has a front connecting portion 321 extending from the corresponding projection (3B) in a direction away from the shaft tube 31, a retaining plate 322 having a central portion that is formed integrally with a top end of the front connecting portion 321 so as to define a retaining space 324 among the corresponding cleat-supporting surface 30, the front connecting portion 321, and the retaining plate 322, and a rearwardly extending flange 323 at a middle portion of a rear side of the retaining plate 322.

The inner pivot arms 33 extend from the inner end 311 of the shaft tube 31 and away from each other, and are located at one side of the front retaining portions 32. The outer pivot arms 34 extend from the outer end 312 of the shaft tube 31 and away from each other, and are located at the opposite side of the front retaining portions 32. The inner pivot arms 33 are aligned respectively with the outer pivot arms 34 so as to define two retainer-receiving spaces 37 at the two opposite sides of the shaft tube 31. Each of the retainer-receiving spaces 37 is located between the corresponding inner pivot arm 33 and the corresponding outer pivot arm 34, which are aligned with each other.

The rear retaining units 4 are disposed respectively within the retainer-receiving spaces 37. Each of the rear retaining units 4 includes a unitary retaining element 41, a pivot pin 42, an adjustment bolt 43, an adjustment nut 44, and a coiled torsional spring 45. One of the retaining units 4 is described in the succeeding paragraphs.

The retaining element 41 has a rear retaining portion 411 that is disposed within the corresponding retainer-receiving space 37 and that includes a rear connecting plate 412 and a clamping plate 413 extending frontwardly from a top end of the rear connecting plate 412 and formed with a frontwardly extending flange 414 at a middle portion of a front side thereof. A pair of parallel left and right side plates 415 extend from two opposite sides of the rear connecting plate 412 in a transverse direction of the shaft tube 31, and are perpendicular to the rear connecting plate 412 and the clamping plate 413. One of the left and right side plates 415 has a forwardly extending rear abutment portion 416 and a laterally extending mounting plate 417.

The pivot pin 42 extends through the corresponding inner and outer pivot arms 33, 34, the side plates 415 of the retaining element 41, and the coiled torsional spring 45 so that the retaining element 41 is rotatable about the pivot pin 42.

The adjustment bolt 43 extends through the mounting plate 417 of the retaining element 41 to engage the adjustment nut 44, and has a head 431 abutting against the mounting plate 417. The spring 45 is disposed between the side plates 415 of the retaining element 41, and has a first end 451 pressing against the corresponding front abutment portion 35 of the pedal body 3, and a second end 452 pressing against an inner side surface 441 (see FIG. 4) of the adjustment nut 44 so as to bias the retaining element 41 to rotate in a predetermined direction such that the rear abutment portion 416 presses against the corresponding front abutment portion 35 of the pedal body 3, thereby permitting adjustment of biasing force of the spring 54. As such, a cleat-retaining space 418 is defined among the corresponding front retaining portion 32 of the pedal body 3, the retaining element 41, and the corresponding cleat-supporting surface 30 so as to confine the cleat 5 therein.

The cleat 5 is generally cross-shaped, and has a planar bottom surface 50 (see FIG. 7) abutting against the corresponding cleat-supporting surface 30 of the pedal body 3, a front end engaging portion 51 inserted into the corresponding front retaining portion 32, a rear end engaging portion 52 confined between the retaining element 41 and the corresponding cleat-supporting surface 30 so as to fix the cleat 5 on the pedal body 3, a left wing portion 53, and a right wing portion 54.

The front end engaging portion 51 of the cleat 5 includes two stepped insert portions 512, each of which has a thick rear portion (512R) and a thin front portion (512F) that is thinner than the thick rear portion (512R), that extends frontwardly from a lower end portion of the thick rear portion (512R), and that is inserted into the retaining space 324 in the corresponding front retaining portion 32 of the pedal body 3. The stepped insert portions 512 define a front groove 513 therebetween, which engages snugly the rearwardly extending flange 323 of the corresponding front retaining portion 32 of the pedal body 3 so as to prevent movement of the front end engaging portion 51 of the cleat 5 on the pedal body 3 in the longitudinal direction of the shaft tube 31.

Figure 7:
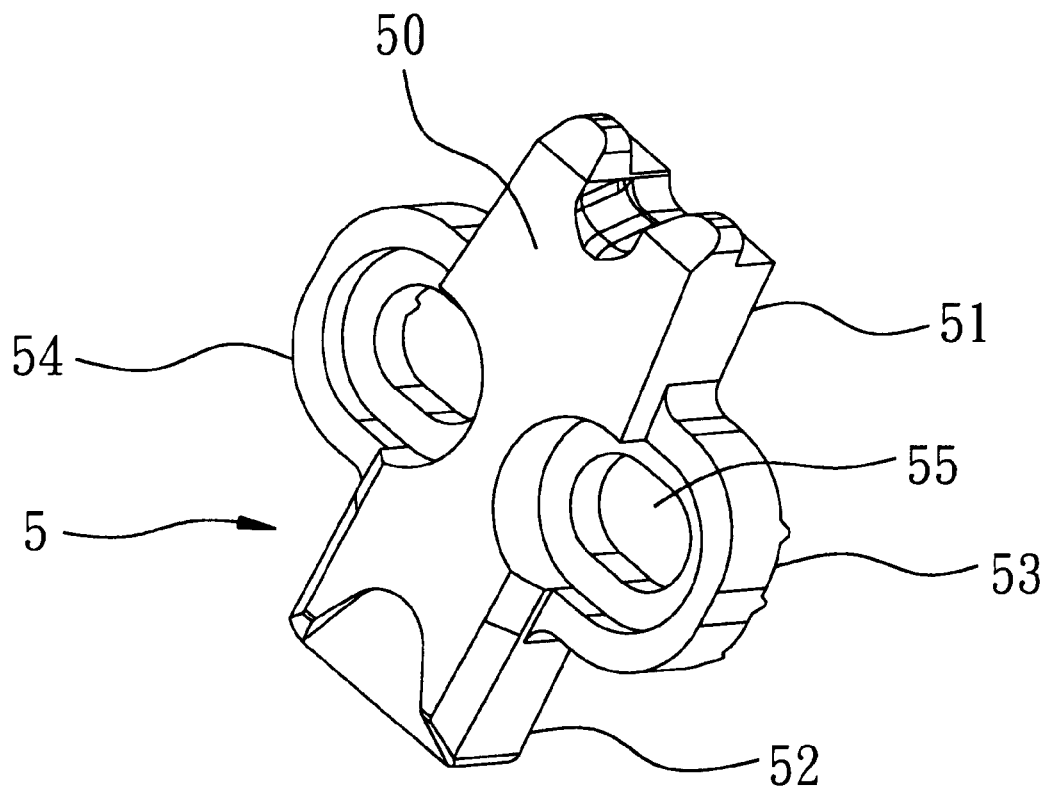
FIG. 7 is a perspective view of the cleat of the preferred embodiment.

Referring to FIG. 7, the bottom surface 50 of the cleat 5 is formed with two counterbores 55 so that the cleat 5 can be connected fixedly to the shoe (not shown) by two headed lock bolts (not shown) in a known manner. The rear end engaging portion 52 of the cleat 5 includes a top surface that has a rear edge which is formed with a U-shaped rear groove 522 at a middle portion, and an intermediate surface 523 (see FIG. 4) that is parallel to the top surface of the rear end engaging portion 52 and that defines a bottom wall of the rear groove 522. The frontwardly extending flange 414 of the retaining element 41 engages snugly the rear groove 522 in the rear end engaging portion 52 of the cleat 5, and presses against the intermediate surface 523 of the cleat 5 so as to prevent movement of the rear end engaging portion 52 of the cleat 5 relative to the pedal body 3.

The left and right wing portions 53, 54 of the cleat 5 have bottom surfaces that are located above those of the front and rear end engaging portions 51, 52 and that are spaced apart from the cleat-supporting surfaces 30 and the inclined inner and outer cleat-guiding surfaces 36, 36'.

The bicycle pedal assembly of this invention has the following advantages:

(1) Because the front retaining portions 32 are formed integrally with the pedal body 3, the structure of the bicycle pedal assembly of this invention is relatively simple.

(2) The arrangement of the inclined inner and outer cleat-guiding surfaces 36, 36' facilitates removal of the cleat 5 from the retaining element 41.

With this invention thus explained, it is apparent that numerous modifications and variations can be made without departing the scope and spirit of this invention. It is therefore intended that this invention be limited only as indicated by the appended claims.

I claim:

1. A bicycle pedal assembly comprising:

a pedal shaft;

a unitary pedal body including a shaft tube sleeved rotatably on said pedal shaft and having an inner end and an outer end, two opposite cleat-supporting surfaces, two front retaining portions formed on two opposite sides of said shaft tube so as to define two retaining spaces, respectively, two aligned inner pivot arms extending from said inner end of said shaft tube and away from each other, two aligned outer pivot arms extending from said outer end of said shaft tube and away from each other, said inner pivot arms being located at one side of said front retaining portions, said outer pivot arms being located at the opposite side of said front retaining portions, said outer pivot arms being aligned respectively with said inner pivot arms so as to define two retainer-receiving spaces at the two opposite sides of said shaft tube, each of said retainer-receiving spaces being located between a corresponding one of said inner pivot arms and a corresponding one of said outer pivot arms, which are aligned with each other, and two front abutment portions extending respectively from the two opposite sides of said shaft tube;

two rear retaining units disposed respectively within said retainer-receiving spaces, each of said rear retaining units including a unitary retaining element mounted pivotally between the corresponding one of said inner pivot arms and the corresponding one of said outer pivot arms and having two parallel side plates and a rear abutment portion, said retaining element cooperating with a respective one of said front retaining portions of said pedal body to define a cleat-retaining space therebetween, a pivot pin extending through said side plates of said retaining element, the corresponding one of said inner pivot arms, and the corresponding one of said outer pivot arms so that said retaining element is rotatable about said pivot pin, and a coiled torsional spring sleeved on said pivot pin and disposed between the corresponding one of said inner pivot arms and the corresponding one of said outer pivot arms so as to bias said retaining element to rotate in a predetermined direction, thereby permitting engagement of said rear abutment portion of said retaining element with a respective one of said front abutment portions of said pedal body; and a unitary cleat disposed on a selected one of said cleat-supporting surfaces of said pedal body and having a front end engaging portion inserted into one of said front retaining portions of said pedal body, and a rear end engaging portion confined between a corresponding one of said retaining elements and the selected one of said cleat-supporting surfaces so as to fix said cleat on said pedal body.

2. The bicycle pedal assembly as claimed in claim 1, wherein each of said cleat-supporting surfaces of said pedal body is planar and T-shaped, and includes an elongated front surface portion extending along a transverse direction of said shaft tube, and an elongated rear surface portion extending along the longitudinal direction of said shaft tube and having an inner end, an outer end, and a middle portion, from which said front surface portion extends forwardly, said pedal body further including two guiding units, each of which includes an inclined inner cleat-guiding surface extending inwardly from said inner end of a corresponding one of said rear surface portions and inclined relative to the corresponding one of said rear surface portions in a direction away from said shaft tube, and an inclined outer cleat-guiding surface extending outwardly from said outer end of the corresponding one of said rear surface portions and inclined relative to the corresponding one of said rear surface portions in a direction away from said shaft tube.

3. The bicycle pedal assembly as claimed in claim 1, wherein said front end engaging portion of said cleat includes two stepped insert portions, each of which has a thick rear portion and a thin front portion that is thinner than said thick rear portion, that extends frontwardly from a lower end portion of said thick rear portion, and that is inserted into said retaining space in a corresponding one of said front retaining portions of said pedal body, said stepped insert portions defining a front groove therebetween, each of said front retaining portions of said pedal body being formed with a rearwardly extending flange for engaging snugly said front groove in said front end engaging portion of said cleat so as to prevent movement of said front end engaging portion of said cleat on said pedal body in the longitudinal direction of said shaft tube.

4. The bicycle pedal assembly as claimed in claim 1, wherein said rear end engaging portion of said cleat includes a top surface that has a rear end edge with a rear groove formed at a middle portion thereof, and an intermediate surface that defines a bottom wall of said rear groove, said retaining element of each of said rear retaining units being formed with a frontwardly extending flange so as to engage snugly said rear groove in said rear end engaging portion of said cleat and so as to press against said middle surface of said cleat, thereby preventing movement of said rear end engaging portion of said cleat relative to said pedal body.

5. The bicycle pedal assembly as claimed in claim 1, wherein each of said springs of said rear retaining units has a first end pressing against a corresponding one of said front abutment portions of said pedal body, and a second end, said retaining element of each of said rear retaining units further having a mounting plate that extends integrally and perpendicularly from one of said side plates and that is formed with a hole therethrough, each of said rear retaining units further including:

an adjustment bolt extending through said hole in said mounting plate of a corresponding one of said retaining elements of said rear retaining units and having a head abutting against said mounting plate of the corresponding one of said retaining elements; and an adjustment nut engaging said adjustment bolt and having an inner side surface facing said mounting plate of the corresponding one of said retaining elements of said rear retaining units so that said second end of a corresponding one of said springs presses against said inner side surface so as to bias the corresponding one of said retaining elements of said rear retaining units to rotate in the predetermined direction, thereby permitting adjustment of biasing force of said springs of said rear retaining units.

* * * * *